(12) United States Patent
Daoud et al.

(10) Patent No.: US 8,106,101 B2
(45) Date of Patent: *Jan. 31, 2012

(54) METHOD FOR MAKING SINGLE-PHASE ANATASE TITANIUM OXIDE

(75) Inventors: Walid Abdelhamld Daoud, Victoria (AU); John Haozhong Xin, Kowloon (CN); Kaihong Qi, Kowloon (CN)

(73) Assignee: The Hong Kong Polytechnic University, Hong Kong SAR (CN)

( * ) Notice: Subject to any disclaimer, the term of this patent is extended or adjusted under 35 U.S.C. 154(b) by 1173 days.

This patent is subject to a terminal disclaimer.

(21) Appl. No.: 11/826,388

(22) Filed: Jul. 13, 2007

(65) Prior Publication Data

US 2011/0003684 A1    Jan. 6, 2011

Related U.S. Application Data

(63) Continuation-in-part of application No. 10/989,100, filed on Nov. 16, 2004, now Pat. No. 7,255,847.

(51) Int. Cl.
*C01G 23/047* (2006.01)

(52) U.S. Cl. .......... 516/90; 423/610; 423/611; 423/612; 423/615; 423/616; 423/274

(58) Field of Classification Search .......... 423/610–612, 423/615, 274, 616; 502/242, 350; 516/90
See application file for complete search history.

(56) References Cited

U.S. PATENT DOCUMENTS

| | | |
|---|---|---|
| 5,049,309 A | 9/1991 | Sakamoto et al. |
| 6,576,589 B1 | 6/2003 | Na et al. |
| 2003/0148885 A1 | 8/2003 | Weisbeck et al. |
| 2003/0171446 A1 | 9/2003 | Murrer et al. |
| 2004/0241502 A1 | 12/2004 | Chung et al. |

FOREIGN PATENT DOCUMENTS

WO    2004/087318    * 10/2004

OTHER PUBLICATIONS

Daoud et al., "*Nucleation and Growth of Anatase Crystallites on Cotton Fabrics at Low Temperatures*," J. Am. Ceram. Soc., 87(5) pp. 953-955 (2004).

* cited by examiner

*Primary Examiner* — Steven Bos

(74) *Attorney, Agent, or Firm* — Jacobson Holman PLLC

(57) ABSTRACT

This invention relates to methods of making single phase nanocrystalline titanium dioxide. It is hereby provided a method for preparing single-phase anatase type titanium dioxide photocatalyst having a particle size of nano level at near room temperatures without the need for a sintering process at high temperatures.

2 Claims, No Drawings

METHOD FOR MAKING SINGLE-PHASE ANATASE TITANIUM OXIDE

This is a continuation-in-part application of application Ser. No. 10/989,100 filed on 16 Nov. 2004, which has been granted as U.S. Pat. No. 7,255,847.

FIELD OF THE INVENTION

The present invention relates to methods for preparing single-phase anatase type titanium dioxide having a particle size of nano level at low temperatures and, more particularly, to a method for preparing a photocatalyst without the need for a high-temperature sintering process.

BACKGROUND OF THE INVENTION

Titanium dioxides are useful materials due to their interesting properties and important applications. A common use for Titanium dioxide ($TiO_2$) is as a photocatalyst. In order to be used as a photocatalyst, titanium dioxide has to exhibit crystallinity. Among the crystalline phases of titanium dioxide, anatase is reported to show the highest performance. The preparation of anatase thin films is usually achieved at temperatures above 400.degrees celsius. However, the need for high temperature processing limits the choice of substrates to heat resistant materials. The growth of anatase titania nanocrystallites at low temperatures is important for the fabrication of nanocrystalline titania films on substrates with low heat resistance, such as wood, paper, plastics, textiles and biomaterials.

Thus, in a case where amorphous titanium dioxide is formed from a titanium-based starting material through hydrolysis and condensation polymerization, it is a necessity to carry out a heat treatment at high temperature, i.e., sintering process, in order to convert the amorphous titanium dioxide to an anatase type titanium dioxide. It is known that the sintering temperature is typically around or above 400.degrees celsius.

Accordingly, it is fundamentally impossible to form anatase titania or a composite oxide containing anatase titania, for example, on substrates having low resistance to heat such as organic polymer substrates or living tissue having low resistance to high temperature, low pressure and high pressure.

It has been reported that anatase nanocrystallites can be grown on cotton fabrics using a boiling water treatment (W. A. Daoud and J. H. Xin, J. Am. Ceram Soc., 87 [5] 953-55 2004). Even though, the processing temperature could be reduced to 100 degrees celsius, the need for a post-preparation heat treatment is still there. However, the in-situ preparation of anatase oxides at temperatures of low temperatures is of great importance not only from the point of view of energy saving, as annealing post-treatment is avoided, but also it would open up new applications in new fields such as biochemistry.

Among conventional methods using titanium dioxide as a photocatalyst, some can be distinguished as the most widely used methods: a first method of using an anatase type titanium dioxide in the powder form and a second one of using a thin film of the anatase type titanium dioxide formed on a specific support. Although the former is superior to the latter in the photocatalyst activity due to the relatively large surface area of the titanium dioxide prepared, the latter is more practicable in the aspect of stability of the titanium dioxide. Therefore, the actually used photocatalysts are prepared by the second method that involves formation of a titanium dioxide film on a support by means of a sol-gel method.

The process used in conventional methods to prepare anatase materials includes the steps of: (a) preparing a titanium oxide precipitate from an aqueous solution of a titanium-based starting material by hydrolysis and condensation polymerization; (b) subjecting the precipitate to filtration to obtain a white amorphous titanium dioxide; (c) sintering the amorphous titanium dioxide at high temperature (above 400 degrees celsius.) to obtain an anatase type titanium dioxide; (d) milling the resulting titanium dioxide to yield a powdery titanium dioxide; (e) dispersing the powder in a specific solvent to prepare an anatase type titanium dioxide solution; and (f) coating the solution on a support.

Such a conventional method for preparing a titanium dioxide photocatalyst is a multistage process that involves the steps of filtration, sintering, milling and dispersion, which may cause an increase in the unit production cost. The conventional method is also a troublesome in that there is a need of milling the anatase type titanium dioxide into very tiny particles, i.e., in the particle size of nano level, and dispersing the particles in a specific solvent prior to a coating step, in order to enhance the outer appearance of the finally coated photocatalyst or to increase the surface area of the photocatalyst. With a large particle size of the anatase type titanium dioxide, an excessively large amount of the precipitate may be formed in the dispersion step and the resulting photocatalyst is inapplicable to a coating solution.

Also, the use of several additives for enhancing the coating characteristics and the hardness of the photocatalyst films may cause a problem such as deteriorating the stability of the titanium dioxide disperse solution and resulting in formation of precipitates.

The most well-known anatase type titanium dioxide powder commercially available is P25 supplied by Degussa, which is now manufactured in a limited number of countries. There are also commercially available coating products containing a photocatalyst dispersed in water and ethanol, which are too expensive due to their expensive preparation process.

OBJECTS OF THE INVENTION

Therefore, the invention of this application solves the aforesaid problems of the related art, and aims at providing a novel process which can produce anatase titania at a low temperature and, in addition, at atmospheric pressure, thereby can be used to form coating films on a variety of substrates including polymer materials or living tissue having low resistance to heat, and moreover can form anatase titania in a variety of forms such as bulk, film, coating, fiber, powder, etc.

DISCLOSURE OF THE INVENTION

Accordingly, this invention provides a method of preparing single-phase anatase type titanium dioxide photocatalyst having a particle size of nano level at temperatures below 58 degrees celsius and, more particularly, to a method for preparing a photocatalyst without the need for a sintering process or other post-deposition treatments.

To achieve the objectives of the present invention, the hereby disclosed method includes adding a titanium-based starting material to a selected solvent containing an acid or base catalyst and an organic acid. This is followed by subjecting the catalyst-containing solution to a heat treatment at temperature of between 35 and 58 degrees celsius to activate the crystallization thereby preparing an anatase type titanium dioxide sol solution. Finally, the anatase type titanium dioxide sol solution is coated onto a support to complete the preparation of the photocatalyst films or made to precipitate into anatase powder.

In particular, according to the invention of this application, a transparent film of anatase titania which has been difficult to from in the related art can be formed on a variety of substrates using a low temperature process, and therefore the fields of application are extremely wide and promising.

DETAILED DESCRIPTION OF THE PREFERRED EMBODIMENT

This invention is now described by way of example with reference to the figures in the following paragraphs.

Objects, features, and aspects of the present invention are disclosed in or are obvious from the following description. It is to be understood by one of ordinary skill in the art that the present discussion is a description of exemplary embodiments only, and is not intended as limiting the broader aspects of the present invention, which broader aspects are embodied in the exemplary constructions.

The method of coating titanium oxides to an article according to this invention may be divided into two steps. The first step involves the forming of a colloidal solution of single-phase titanium dioxide oxide by hydrolysis and condensation of a titanium precursor in a solvent. The titanium precursor used in the making of the sol mixture can be various titanium compounds, for example, titanium alkoxides, such as titanium tetraisoproxide, titanium tetrabutoxide; titanium nitrate; titanyl sulfate, titanium halides, such as titanium chloride.

The solvent used in this invention is to provide a suspending medium. Water is the main medium used. In this case, a direct hydrolysis of the alkoxides occurs to produce hydroxide compounds. This is followed by a polycondensation reaction to give titanium oxide product. A small amount of an alcohol can also be added in order to accelerate the hydrolysis step. Ethanol may be a preferred choice as it is environmental friendly, available and low cost, but of course other alcohols can be used. Ethanol can react with the alkoxides such as titaniumtetraisopropoxide to give titanium tetraethoxide. This may accelerate the hydrolysis step of the alkoxide group to give a hydroxide product.

Acids and bases may be used to as catalysts for the hydrolysis and condensation of the titanium precursors. Organic acids, such as acetic acid or formic acid are used as crystallization-accelerating and stabilizing agents.

The sol mixture may be prepared, at temperatures of between 35 and 58 degrees celsius by mixing the titanium dioxide precursor with the solvent. The mixture is then stirred for a period of time prior to coating. The time of preparation is optional and entirely depending on the phase and size of crystals. Short reaction time may lead to the formation of anatase and brookite mixture. The use of the high end of the preparation temperatures may reduce the reaction time in order to form single-phase anatase, however it may produce larger nanocrystals. The following equations may summarize the principal reactions involved:

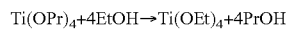

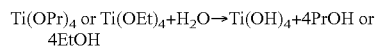

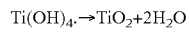

The article is then coated with the anatase colloidal sol solution using various deposition techniques such as dip-coating, spin-coating, solvent casting, spraying, doctor blading, etc.

The article may then be dried in air and finally cured at temperatures similar to the preparation temperature range for a certain period of time in order to develop the inorganic network and densify the coatings and thus improve the interfacial surface adhesion to the article. These curing time and temperature after coating are entirely optional.

Example 1

In a 500 ml beaker, 240 ml water, 60 ml ethanol, 60 ml acetic acid, and 3 ml nitric acid were mixed and stirred rapidly. To this, 7.5 ml titanium tetraisopropoxide were added while stirring. The formed transparent mixture was then heated to 38 degrees celsius under continuous stirring for 12 hours. The resulting solution was colourless and transparent. A silicon wafer substrate and a non-alkali glass substrate were coated with the aforesaid solution by spin coating at 1500 rpm for 50 seconds and the respective substrates were air dried for one hour and then oven dried at 38 degrees celsius for 4 hours. Observations of high resolution transmission electron microscope showed that the formed films were of pure anatase phase according to the lattice fringe analysis which shows a lattice spacing of 0.352 nm that is associated with the anatase plane (101). When 1 ml of sodium carbonate solution (10% weight) was added to 10 ml of the prepared anatase solution, white solid precipitated. This was collected by centrifugation and filtration. The solid powder was then washed once with water and once with acetone and finally dried at 38.degrees celsius for 4 hours. X-ray diffraction analysis of the resulting powder confirmed that the product is pure anatase.

Example 2

In a 500 ml beaker, 240 ml water, 60 ml ethanol, 60 ml acetic acid, and 3 ml nitric acid were mixed and stirred rapidly. To this, 7.5 ml titanium tetraisopropoxide were added while stirring. The formed transparent mixture was then heated to 58 degrees celsius under continuous stirring for 8 hours. The resulting solution was colorless and transparent. A silicon wafer substrate and a non-alkali glass substrate were coated with the aforesaid solution by spin coating at 1500 rpm for 50 seconds and the respective substrates were air dried for one hour and then oven dried at 38 degrees celsius for 4 hours. Observations of high resolution transmission electron microscope showed that the formed films were of pure anatase phase according to the lattice fringe analysis which shows a lattice spacing of 0.352 nm that is associated with the anatase plane (101). When 1 ml of sodium carbonate solution (10% weight) was added to 10 ml of the prepared anatase solution, white solid precipitated. This was collected by centrifugation and filtration. The solid powder was then washed once with water and once with acetone and finally dried at 38.degrees celsius for 4 hours. X-ray diffraction analysis of the resulting powder confirmed that the product is pure anatase.

The Novel Preparation Method has the Following Advantages (1) The method eliminates a need of the sintering and milling steps. That is, the single-phase anatase type titanium dioxide having a size of nano level can be prepared by a single integrated step of filtration, sintering, milling and dispersion according to the present invention. Thus there is no necessity to perform a sintering step for crystallization or a milling step of the resulting titanium dioxide agglomerate after the sintering.

(2) The method also eliminates the need of a dispersion step for preparing a coating solution. In this method, the anatase type titanium dioxide aqueous solution with a particle size of nano level is maintained in a stable state for a long time and thus can be used immediately as a coating solution without any treatment. This makes it possible to skip a step of dispersing the milled titanium dioxide particles in the solvent to prepare a separate coating solution.

(3) In preparation of a titanium dioxide photocatalyst having different properties due to various additives, the invention allows a simple process for the preparation while reducing the possibility of various problems arisen from the additives dispersed in the solvent, such as chemical reaction, precipitation and phase separation.

(4) The photocatalyst obtained in this preparation method is available as a coating applicable to various types of supports in a simple way. According to the preparation method of the present invention, the anatase type titanium dioxide solution having a particle size of nano level exhibits an optical activity and thus can be coated on the supports without any separate treatment. This coating on the support forms the final photocatalyst only after a drying.

(5) Due to the much reduced processing temperatures of the present method, thereby film coating of single phase anatase can be performed on a variety of substrates including polymer materials or living tissue having low resistance to heat, and moreover can form anatase titania in a variety of forms such as bulk, film, fiber, powder, etc.

As described above, the preparation method of the present invention makes it possible to provide an anatase type titanium dioxide having a controllable particle size of nano level in a single step, the anatase type titanium dioxide being easily coated on a support. Namely, the present invention method eliminates the need for filtration, sintering, milling, dispersion and sintering in the preparation of a titanium dioxide photocatalyst to make the preparation process simple with reduced production cost, as well as making it easier to introduce various additives in the photocatalyst, thereby providing a photocatalyst film with high strength applicable to almost all type of supports.

While the preferred embodiment of the present invention has been described in detail by the examples, it is apparent to those skilled in the art that modifications and adaptations can be made in the present invention without departing from the spirit or scope of the invention. Furthermore, the embodiments of the present invention shall not be interpreted to be restricted by the examples or figures only. It is to be expressly understood, however, that such modifications and adaptations are within the scope of the present invention, as set forth in the following claims. For instance, features illustrated or described as part of one embodiment can be used on another embodiment to yield a still further embodiment. Thus, it is intended that the present invention cover such modifications and variations as come within the scope of the claims and their equivalents.

What is claimed is:

1. A method for preparing single-phase anatase titanium dioxide having a nano level particle size, comprising: adding a titanium-based starting material to a solvent containing about two-thirds by weight of water, one-sixth by weight of alcohol, and one-sixth by weight of an organic acid; subjecting the resulting solution to heat treatment at a temperature of between 35 and 58° C. to activate crystallization and thereby obtaining a single-phase anatase titanium dioxide sol solution.

2. The method of claim 1 wherein the resulting solution is heat treated at a temperature of between 51 and 58° C.

\* \* \* \* \*